(12) United States Patent
Hayford, III et al.

(10) Patent No.: US 12,305,078 B2
(45) Date of Patent: May 20, 2025

(54) DUAL COMPONENT SYSTEMS FOR ADDITION OF PIGMENT DISPERSIONS

(71) Applicant: Laticrete International, Inc., Bethany, CT (US)

(72) Inventors: Jack Hayford, III, Arlington, TX (US); Brandon Serraile, Aubrey, TX (US); Eerik Maandi, Rocky Hill, CT (US)

(73) Assignee: LATICRETE INTERNATIONAL, LLC, Bethany, CT (US)

( * ) Notice: Subject to any disclaimer, the term of this patent is extended or adjusted under 35 U.S.C. 154(b) by 613 days.

(21) Appl. No.: 17/582,623

(22) Filed: Jan. 24, 2022

(65) Prior Publication Data

US 2022/0235236 A1 Jul. 28, 2022

Related U.S. Application Data

(60) Provisional application No. 63/141,741, filed on Jan. 26, 2021.

(51) Int. Cl.
*C09D 163/00* (2006.01)
*B01F 33/84* (2022.01)
*C09D 7/80* (2018.01)
*B01F 101/30* (2022.01)

(52) U.S. Cl.
CPC ............... *C09D 7/80* (2018.01); *B01F 33/84* (2022.01); *C09D 163/00* (2013.01); *B01F 2101/30* (2022.01)

(58) Field of Classification Search
CPC .......... C09D 7/80; C09D 163/00; C09D 7/00; C09D 151/00; B01F 2101/30; B01F 2101/00
See application file for complete search history.

(56) References Cited

U.S. PATENT DOCUMENTS 5,804,616 A * 9/1998 Mowrer ............. C08G 59/4085
106/287.11

OTHER PUBLICATIONS

Amy Made, YouTube video "Resin Craft Guide #1 How to Properly Mix in Powder Pigments", published Jul. 5, 2014. https://www.youtube.com/watch?v=OPpZpY6Pt0A (Year: 2014).*

(Continued)

*Primary Examiner* — Smita S Patel
*Assistant Examiner* — Sarah Catherine Case
(74) *Attorney, Agent, or Firm* — DeLio Peterson & Curcio LLC; Kelly M. Nowak

(57) ABSTRACT

Apparatus, systems and methods that add pigment/colorant to a two-part reactive resin coating formulation without deleteriously affecting the stoichiometric ratio of resin-to-hardener in the two-part reactive resin coating formulation (2K coating). Two-component apparatus and systems are provided that include a first compartment having a pigmented resinous composition and a second compartment having a hardener composition. The pigmented resinous and hardener compositions are discharged from the two-component apparatus/systems in a mixed or unmixed state to render a dual pigmented resin-hardener composition having a stoichiometric ratio of resin-to-hardener substantially the same as that of the 2K coating, such that when mixed therewith, the dual pigmented resin-hardener composition avoids altering the stoichiometric ratio of resin-to-hardener of the 2K coating.

13 Claims, 1 Drawing Sheet

(56) References Cited

OTHER PUBLICATIONS

Naked Fusion Resin, "Instructions for Deep Pour Resin". https://crownpolymers.com/pdf/CrownTech-Technical-Bulletin-No.-10-Mix-Guidelines.pdf. (Year: 2020).*

National Science Teaching Association, "Lab 17 Limiting Reactants: Why Does Mixing Reactants in Different Mole Ratios Affect the Amount of the Product and the Amount of Each Reactant That Is Left Over?" https://static.nsta.org/extras/adi-chem/Lab17StudentHandout-LimitingReactants.pdf (Year: 2017).*

Nordson EFD, Engineered Fluid Dispensing 2K Product Catalog, Third Edition. https://empirefoam.com/pdfs/misc/Empirefoam.com%202K%20Product%20Catalog.pdf. (Year: 2016).*

* cited by examiner

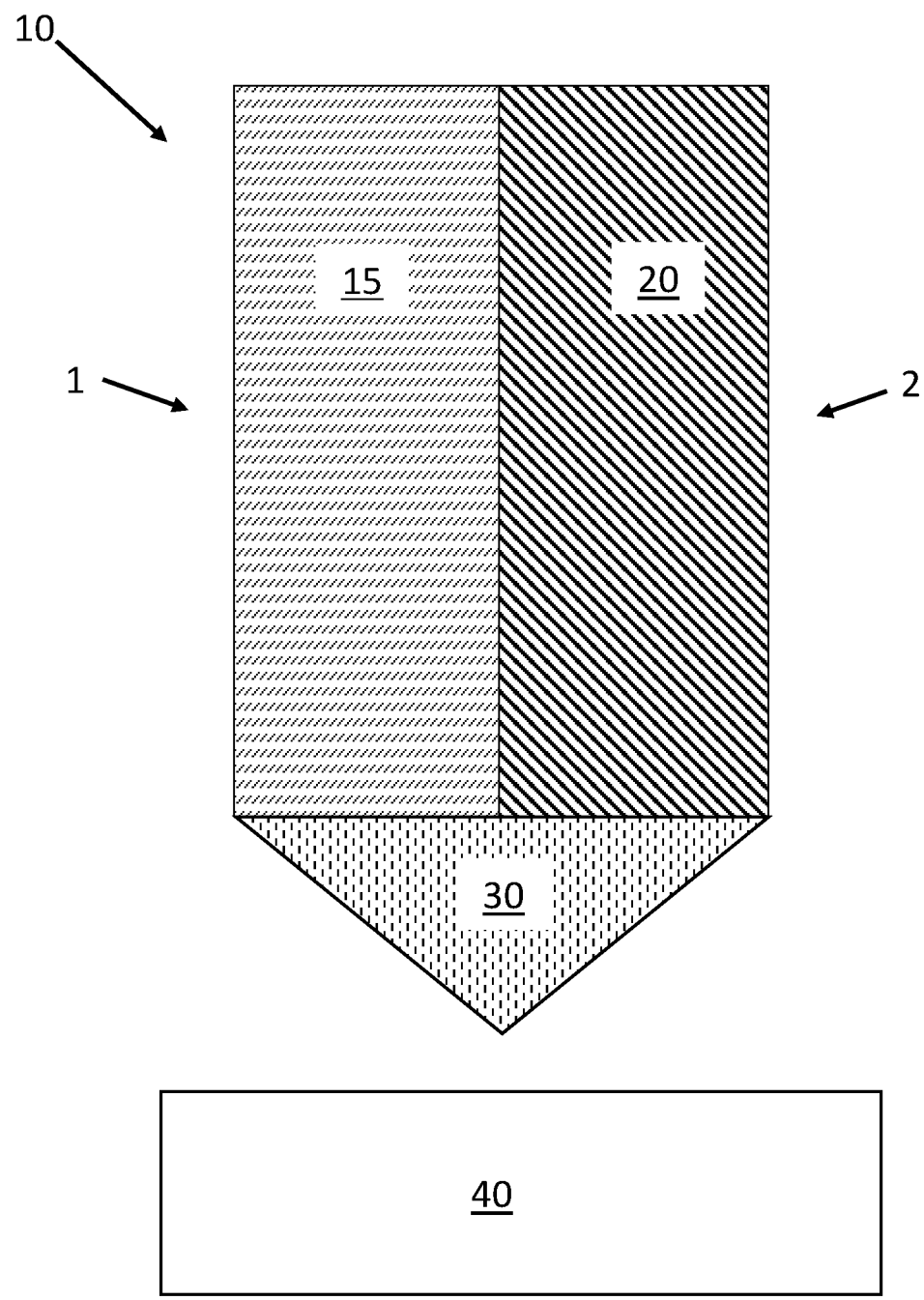

DUAL COMPONENT SYSTEMS FOR ADDITION OF PIGMENT DISPERSIONS

BACKGROUND OF THE INVENTION

1. Field of the Invention

The present invention is directed to compositions and coatings, and in particular, apparatus, systems and methods for pigment dispersion addition to 2K reactive coatings.

2. Description of Related Art

The addition of pigment compositions to reactive coatings is well known. Typically, a pigment composition may be added to the coating formulation during manufacture, or it may be added to the coating formulation just prior to use thereof. Pigment compositions may be added to either one-part compositions or two-part compositions.

Common two-part compositions include 2K reactive coating formulations. A 2K coating is a resin or resinous composition that must be mixed with a hardener, catalyst or activator. Once the 2K coating hardens, it is much less susceptible to damage from chemicals, weather, and/or UV rays. In mixing 2K reactive coatings it is essential proper quantities or amounts of Part A (i.e., the resin/resinous component) be mixed with Part B (i.e., the hardener/catalyst/activator component) to provide a resultant coating with desired properties, characteristics, and functionality.

While pigment compositions may be added to Part A or Part B of the mixture, it has been found that the direct addition of a pigment composition into one part of the mixture deleteriously affects the characteristics and attributes of the resultant reactive coatings. This is especially true with two-part coating formulations that require exact stoichiometric or near stoichiometric amounts of Part A to Part B to provide a coating with desired properties. The addition of a pigment composition to only Part A or Part B of the mixture alters the ratio of resin to hardener, which again, is important for the coating to achieve a complete cure and for the final coating to have the desired properties.

To address this issue, methods have been aimed at short-filling the resin (Part A) container so that it is not entirely filled to accommodate for the addition of a pigment composition to fill the empty portion of such container. However, this approach is often inadequate, time consuming, and results in inconsistencies from batch-to-batch in the coatings. It also results in unbalanced stoichiometric amounts of Part A to Part B rendering a coating formulation not fit for its intended purpose and standards. Alternate approaches have included adding a pigment dispersed in resin to the mixed two-part reactive composition, however, this alters the ideal or desired stoichiometric ratio of Part A to Part B and deleteriously affects the resultant coating.

The present invention provides a solution to the problems of known pigment composition addition approaches to two-part reactive coating formulations.

SUMMARY OF THE INVENTION

Bearing in mind the problems and deficiencies of the prior art, it is therefore an object of the present invention to provide apparatus for adding pigment to resinous coatings that maintain the stoichiometric ratio of the resin/resinous component (Part A) to the hardener/catalyst/activator component (Part B).

It is another object of the present invention to provide methods of adding pigment to resinous coatings while maintaining the stoichiometric ratio of the Part A and Part B components.

Another object of the invention is to providing pigmented two-part reactive coatings and formulations that are stoichiometrically balanced.

In one or more embodiments, the invention is directed to an apparatus for adding pigment to a two-part reactive resin formulation having a set stoichiometric ratio of resin-to-hardener. The apparatus includes a first compartment containing a pigmented resinous composition, a second compartment containing a hardener composition, and one or more dispensing components for discharging the pigmented resinous composition and the hardener composition from the first and second compartments and into the two-part reactive resin formulation. Together the dispensed pigmented resinous composition and hardener composition render a pigmented resin-hardener dispersion having a stoichiometric ratio of pigmented resin-to-hardener substantially equivalent to the set stoichiometric ratio of resin-to-hardener of the two-part reactive resin formulation.

In embodiments of the invention, the first and second compartments are parts of a two-component system for delivering the pigmented resinous composition and the hardener composition into the two-part reactive resin formulation. The two-component system may be a dual component syringe, a two-component packaging system, a dual pack system, flexible divider pouches, dual burst pouches, matching foil bags, and/or a packaging system that delivers fixed amounts of the pigmented resinous composition and the hardener composition. In various embodiments of the present two-component system, the first and second compartments may be adjoined together, separated from one another, or received in a frame of such two-component system.

In one or more embodiments of the invention the pigmented resinous composition may entirely or partially fill the first compartment, while the hardener composition may entirely or partially fill the second compartment. The set stoichiometric ratio of resin-to-hardener in the two-part reactive resin formulation includes either a known manufacturer provided value or a set value determined by an end user. The pigmented resinous composition may be the same resin as that which is in the two-part reactive resin formulation, or it may be compatible therewith. Similarly, the hardener composition may be the same hardener as that which is in the two-part reactive resin formulation, or it may be compatible therewith. The stoichiometric ratio of the pigmented resin-hardener dispersion may be the same as, or closely match, the set stoichiometric ratio of resin-to-hardener. In the invention, the stoichiometric ratio of the pigmented resin-hardener dispersion does not deleteriously affect the set stoichiometric ratio of resin-to-hardener of the two-part reactive resin formulation.

In accordance with the various embodiments, the pigmented resinous composition and the hardener composition are dispensed in a mixed state. In other embodiments the pigmented resinous composition and the hardener composition are dispensed in an unmixed state. The invention may further include a frame that has compartments to hold the first compartment and the second compartment for respectively dispensing the pigmented resinous composition and the hardener composition into the two-part reactive resin formulation. The frame may be a part of a syringe.

In one or more additional embodiments, the invention is directed to a method for adding pigment to a two-part reactive resin coating formulation. The method includes providing a two-component system having a first compartment containing a pigmented resinous composition and a second compartment containing a hardener composition. A first stoichiometric ratio of resin-to-hardener in the two-part reactive resin formulation is determined, and then the pigmented resinous composition and the hardener composition are dispensed from the first and second compartments in a second stoichiometric ratio that substantially matches the first stoichiometric ratio. The pigmented resinous composition and the hardener composition is mixed with the two-part reactive resin coating formulation to provide a pigmented two-part reactive resin coating formulation having the first stoichiometric ratio unaffected by the addition of the pigmented resinous and hardener compositions.

In these embodiments the two-component system includes a dual component syringe, a two-component packaging system, a dual pack system, flexible divider pouches, dual burst pouches, matching foil bags, and/or a packaging system that delivers fixed amounts of the pigmented resinous composition and the hardener composition. The first and second compartments are adjoined to each other, separate from each other, or reside in cartridges that are received and held by a frame or housing of the two-component system. The pigmented resinous composition is entirely or partially dispensed from the first compartment, and similarly, the hardener composition is entirely or partially dispensed from the second compartment. The first stoichiometric ratio of resin-to-hardener may be a manufacturer set stoichiometric ratio, or it may be determined by a ladder study.

In accordance with the invention, the pigmented resinous composition is the same as or compatible with the resin in the two-part reactive resin coating formulation. The hardener composition is the same as or compatible with the hardener in the two-part reactive resin coating formulation. The pigmented resinous composition and the hardener composition are dispensed in a mixed state, or alternatively, in an unmixed state. When dispensed in a mixed state, the pigmented resinous composition and hardener composition being dispensed from the first and second compartments to provide a dual pigmented resin-hardener dispersion having the second stoichiometric ratio that does not deleteriously affect the first stoichiometric ratio of resin-to-hardener of the two-part reactive resin coating formulation.

In various embodiments, together the pigmented resinous composition and the hardener composition comprise a dual pigmented resin-hardener dispersion that is dispensed into the two-part reactive resin coating formulation in an amount from 1 wt. % to 20 wt. %, based on a total weight percentage of the two-part reactive resin coating formulation. In certain embodiments up to 50 wt. % of the dual pigmented resin-hardener dispersion is dispensed into the two-part reactive resin coating formulation, based on a total weight percentage of the two-part reactive resin coating formulation. In other embodiments up to 50 wt. % of the pigmented resinous composition and the hardener composition in combination is dispensed into the two-part reactive resin coating formulation, based on a total weight percentage of the two-part reactive resin coating formulation. The various two-part reactive resin coating formulations of the invention comprise 2K reactive coatings of an epoxy coating, acrylate coating, urethane coating, polyurea coating, polyaspartic coating, and/or combinations thereof.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 illustrates a two-component system for pigment addition to a coating formulation in accordance with one or more embodiments of the invention.

DESCRIPTION OF THE PREFERRED EMBODIMENT(S)

In describing the preferred embodiments of the invention, reference will be made herein to FIG. 1 of the drawings in which like numerals refer to like features of the invention.

In two-part reactive coating formulations (i.e., 2K coating), the current market solution only requires addition of a colored resin portion to add colorant/pigments to the 2K coating. However, in doing so, concessions are made to the mechanical properties of the 2K coating due to the ideal stoichiometric or near stoichiometric blend of such 2K coating being detrimentally changed. The present invention is directed to apparatus, systems and methods for adding pigment to two-part reactive resin or resinous coating formulations. The invention provides the ability to add a pigmented resin-hardener dispersion to a two-part formulation while maintaining a desired resin/resinous composition (Part A component) to hardener/catalyst/activator/cross-linker composition (Part B component) mixing ratio. That is, the invention allows the ideal stoichiometric ratio of resin to hardener in the 2K coating to be maintained after colorant/pigment has been added thereto. While not meant to be limiting, for ease of understanding the invention the Part A component may be referred to as a resin component/composition and the Part B component may be referred to as a hardener component/composition herein.

As discussed above, prior art approaches added pigment dispersed in resin to the mixed two-part reactive coating formulation and/or short-fill the resin component (e.g., adding pigment to the resin component (Part A) in a short-filled container). It has been found that use of only a pigmented resin composition may undesirably alter the stoichiometric ratio of resin to hardener components. This, in turn, deleteriously affects both the resultant pigmented coating formulation and the applied, cured coating itself. These prior art pigment additions include pigment powder dispersed in a suitable resin. In the short-fill approach, a desired amount of the resin component (Part A) is determined, a container short-filled with the resin component (Part A) (i.e., not filled all the way), and then a can of pigmented composition is added to the resin component (Part A) within the container to achieve the desired total amount. However, these approaches of measuring, filling and mixing are done on the jobsite where the coating is to be applied by a human (e.g., worker, installer, etc.). The amount of pigmented resin composition that is actually delivered into the resin is often influenced by human error (e.g., the operator doing more or less work in emptying the can), thereby introducing inconsistent results from batch-to-batch in the coating mixture formulation and/or the cured coating.

The various embodiments of the invention overcome the problems associated with known approaches, and are directed to apparatus, systems and methods that provide easier approaches of adding colorant/pigment while maintaining ideal or preferred stoichiometric ratio of resin (Part A) to hardener (Part B) in the starting/base 2K coating formulation. Referring to FIG. 1, one or more embodiments of the invention are directed to two-component systems 10 for adding a resinous pigmented dispersion plus hardener component (i.e., a pigmented resin-hardener dispersion) to a 2K coating formulation. In various embodiments the two-component system 10 may include, but is not limited to, a dual component syringe, a two-component packaging system, a dual pack system, flexible divider pouches, dual burst pouches, matching foil bags, or any other packaging systems that allows fixed amounts of a pigmented resin component and a hardener component to be added to a coating formulation.

The two-component system 10 includes a first compartment 1 containing a pigmented resinous dispersion/component 15 and a second compartment 2 containing a hardener composition/component 20. In one or more embodiments, the pigmented resinous dispersion is a pigment/colorant dispersed within a reactive resin/resinous composition. The pigmented resinous dispersion 15 may entirely fill, or partially fill, the first compartment 1. The second compartment 2 contains a stoichiometric, or near stoichiometric, amount of hardener composition 20 for the pigmented resinous dispersion 15. Like that of the pigment dispersion, the hardener composition 20 may entirely fill, or partially fill, the second compartment 2. It should be appreciated that these compartments of the two-component system 10 may be adjoined to each other, separate from each other (e.g., separate packs, pouches, etc.), or they may be cartridge (i.e., containers) that are received and held by a frame or housing of the two-component system.

In one or more preferred embodiments, the two-component system 10 is a dual component syringe, or other two component packaging system, that resides or is insertable into a housing for dispensing the pigmented-resin 15 and hardener 20. The dual component syringe includes the first compartment 1 containing a pigmented resinous dispersion/component 15 and a second compartment 2 containing a hardener composition/component 20. The dual component syringe may allow for dispensing of the pigmented-resin 15 and hardener 20 in a mixed state or in an unmixed state, as well as in varying amounts of each composition to enable the same, or nearly the same, stoichiometric or near stoichiometric amount of resin:hardener in the 2K coating. In one or more embodiments of the invention, the syringe may contain exact amounts of pigmented-resin 15 and hardener 20 in the different compartments to match (i.e., the same as or identical) to the resin-to-hardener ratio of the 2K coating.

The present two-component systems 10 provide dual pigmented-resin 15 and hardener 20 compositions that may be provided into a 2K coating formulation without deleteriously affecting the stoichiometry of such 2K coating. Together the pigmented-resin 15 plus hardener 20 combination may be referred to herein as the dual pigmented resin-hardener dispersion(s) 30 of the invention.

In accordance with one or more embodiments, the stoichiometric or near stoichiometric ratio of pigmented-resin composition/dispersion 15 to hardener composition 20 is selected or adjusted to match, or closely match, the ratio of resin (Part A) to hardener (Part B) in the 2K coating 40 itself, so as not to deleteriously affect the resultant coating or desired properties thereof. That is, the pigmented resin component 15 to hardener component 20 in the present dual pigmented resin-hardener dispersions 30 of the invention are in stoichiometric or near stoichiometric ratio with each other matching the stoichiometric or near stoichiometric ratio of Part A to Part B in the 2K coating formulation 40 (i.e., the SBQ coating) into which it is deposited and mixed. In this manner the stoichiometric ratio of the 2K coating formulation 40 is unaffected by the addition of the present pigmented resin-hardener dispersions. The resultant coating composition of the invention is a pigmented 2K coating 40 formulation that maintains the stoichiometric balance of resin to hardener in the base/desired/starting/selected 2K coating itself.

In determining the stoichiometric or near stoichiometric values of the present pigmented-resin 15 and hardener 20, the stoichiometric values of resin-to-hardener in the target/selected 2K coating formulation may be provided (known) or calculated. For instance, the desired (or near) stoichiometric addition amounts may be determined by calculating the equivalent weight of resin in the pigmented-resin composition 15, and based thereon, determining an amount of hardener 20 needed to be added to the pigmented-resin composition 15 that renders an equivalent, or near equivalent, stoichiometric value/ratio as that of the 2K coating formulation.

In other embodiments, the stoichiometric or near stoichiometric values may be determined by way of a ladder study, wherein a series of pigmented-resin 15 and hardener 20 samples having differing ratios of resin-to-hardener are provided in incrementally increasing amounts. Incrementally increasing samples are step-wise tested to determine which sample has the ideal or optimum mixing stoichiometric ratio as that of the 2K coating formulation. In one or more embodiments, the optimum ratio may be determined by testing a chosen parameter for which a particular value or range was desired.

Once the selected pigmented resin component 15 and hardener component 20 composition of the invention are determined (i.e., those that have stoichiometric values at or near the stoichiometric value of the starting coating formulation 40), such compositions may be added to the coating formulation 40. These compositions may be dispensed from the various two-component systems 10 of the invention. The two-component systems 10 enable the dual pigmented-resin 15 and hardener 20 compositions to be dispersed and provided into the 2K coating formulation in either a mixed state or in an unmixed state, both without deleteriously affecting the stoichiometry of such 2K coating. In a mixed state, the pigmented-resin 15 and hardener 20 may be mixed together in system/dispenser 10 prior to, or upon, being dispensed from the dispenser 10. In an unmixed state, the pigmented-resin 15 and hardener 20 may be simultaneously or sequentially dispensed from system 10 into the 2K coating formulation.

In the present dual pigmented resin-hardener dispersions 30, since the pigmented resin dispersion 15 is added with its own stoichiometric (or near stoichiometric) amount of hardener 20, the pigmented resin-hardener dispersion may be added to the 2K coating formulation 40 without altering the desired ratio of resin to hardener in such 2K coating. That is, the dual pigmented resin-hardener dispersion(s) 30 maintains the stoichiometric or near stoichiometric balance of resin to hardener in the 2K coating to allow such 2K coating achieve a complete cure and for the final coating to have its desired physical and chemical properties. The various dual pigmented resin-hardener dispersions 30 of the invention added to the 2K coating provides a colored/pigmented 2K coating formulation 40 that is unaffected by the addition of the dual pigmented resin-hardener dispersion 30.

The amount of pigmented resin dispersion 15 added to the coating 40 is dependent upon the amount of resin in the pigmented resin dispersion 15. Likewise, the amount of hardener 20 will also vary, and is ultimately dependent upon the amount resin in the selected pigmented resin dispersion. In one or more embodiments, it may be preferred to keep the added amount of pigmented resin 15/hardener 20 combination to a minimum required that provides the desired or acceptable color, as well as be able to retain ideal stoichiometric or near stoichiometric ratio of resin-to-hardener in the target/selected 2K coating. The resin used in the pigmented resin 15/hardener 20 dispersion may be the same resin as that present in the 2K coating formulation into which it is to be deposited. Alternatively, the materials of the pigment composition 15 and hardener composition 20 may be different materials from those of the 2K coating that are compatible therewith.

The various dual pigmented resin-hardener dispersions 30 of the invention (i.e., pigment in resin plus hardener) may be added to 2K coating formulations 40 in amounts up to 50%, or more, based on a total weight percentage of the 2K coating. In one or more embodiments, the dual pigmented resin-hardener dispersion may preferably be added up to 40 wt. %, preferably up to 33 wt. %, and more preferably from 1 wt. % to 20 wt. %, based on a total weight percentage of the 2K coating. In one or more embodiments, either the pigment dispersion 15 or the hardener 20 may be overloaded or provided an excess within the two-component system 10. In doing so, the ratio of the dual pigmented resin-hardener dispersions 30 may be adjusted to balance or adjust ratios of the 2K coating formulation 40 to provide a desired stoichiometric or near stoichiometric ratio in the final coating formulation. For instance, to achieve certain physical properties it may be necessary to have an excess of the resin component or the hardener component. In this case, the pigment dispersion 15, or the hardener 20 may need to be provided in excess to match the resin-to-hardener ratio of the base 2K coating. It should be appreciated that the present methods and systems may be used with any 2K reactive coating including, but not limited to, epoxy coatings, acrylate coatings, urethane coatings, polyurea coatings, and/or polyaspartic coatings.

In accordance with one or more embodiments, reactive dual pigmented resin-hardener dispersions 30 of the invention were formulated and compared against prior art approaches for pigment dispersion addition to reactive coatings. Referring to the below tables, known samples included two currently available reactive 2K coatings that includes the resin Part A component mixed with hardener component Part B. For instance, prior art samples 1-3 were prepared with the 2K coating Surface Build Quartz ("SBQ"), which is a high-performance epoxy coating that generates a durable floor coating, particularly suited for heavy traffic. The SBQ product includes a resin Part A that must be mixed with a hardener Part B, at the manufacturer's stoichiometric ratio blend at which the coating was formulated, to provide a floor coating with desired physical and mechanical properties. These prior art samples 1-3 were compared with Example 1 of the invention, which included a dual pigmented resin-hardener dispersion 30 of the invention added to the SBQ 2K coating. Similarly, prior art samples 4-6 were prepared with a Clear Base (CB) 2K coating Surface Build Quartz ("SBQ"), which is a two-component epoxy coating intended for mid-coats in epoxy coating, and compared with Example 1 of the invention.

Referring to Table 1 below, prior art sample 1 ("PA 1") is an SBQ 2K coating formulation comprising 100 wt. % Part A mixed with 100 wt. % Part B, and a pigmented resin/resinous dispersion (i.e., no hardener is present in this resin/resinous dispersion) added thereto in an amount of 15 wt. % based on a total percentage of the SBQ 2K coating (i.e., 15 wt. % resin dispersion is added to the 100% SBQ 2K coating resulting in an overfill). The prior art sample 2 ("PA 2") is an SBQ 2K coating formulation comprising 100 wt. % Part B mixed with 85 wt. % Part A (a 15 wt. % reduction short fill or underfill), plus 15 wt. % of the pigmented resin dispersion added to the formulation to replace the short filled Part A. Prior art sample 3 ("PA 3") is an SBQ 2K coating formulation comprising 100 wt. % Part B mixed with 50 wt. % Part A (a 50 wt. % reduction short fill), plus 50 wt. % of the pigmented resin dispersion added to the formulation to replace the short filled Part A.

Example 1 of the present invention is an SBQ 2K coating formulation comprising 100 wt. % Part A mixed with 100 wt. % Part B, plus a dual pigmented resin-hardener dispersion 30 of the invention added to the SBQ 2K coating in an amount of 50 wt. % based on the total weight percentage of the SBQ 2K coating. The addition of the present dual pigmented resin-hardener dispersion 30 adds volume to the base SBQ 2K formulation.

The resultant coating physical properties show that Example 1 of the present invention had overall superior results as compared to prior art samples 1-3. The inventive Example 1 resulted in significantly higher hardness measures as compared to the prior art pigment replacement or underfill approaches, particularly those prior art approaches with a higher percentages of Part A underfill/replacement.

TABLE 1

| SBQ SAMPLES | PA 1 | PA 2 | PA 3 | EXAMPLE 1 |
| --- | --- | --- | --- | --- |
| Adhesion Day 1 | 408.05 | 593.03 | 526.43 | 517.8 |
| Hardness Day 1 | 37 | 40 | 29.4 | 42.6 |
| Hardness Day 3 | 65 | 68 | 34.8 | 70.2 |

Referring to Table 2 below, prior art sample 4 ("PA 4") is Clear Base (CB) 2K coating comprising 100 wt. % Part A mixed with 100 wt. % Part B and a pigmented resin/resinous dispersion (i.e., no hardener is present in this resin/resinous dispersion) added thereto in an amount of 15 wt. % based on a total percentage of the CB 2K coating (i.e., 15 wt. % resin dispersion is added to the 100% CB 2K coating resulting in an overfill). The prior art sample 5 ("PA 5") is a CB 2K coating formulation comprising 100 wt. % Part B mixed with 85 wt. % Part A (a 15 wt. % reduction short fill), plus 15 wt. % of the pigmented resin dispersion added to the formulation to replace the short filled Part A. Prior art sample 6 ("PA 6") is a CB 2K coating formulation comprising 100 wt. % Part B mixed with 50 wt. % Part A (a 50 wt. % reduction short fill), plus 50 wt. % of the pigmented resin dispersion added to the formulation to replace the short filled Part A.

Example 2 of the present invention is a CB 2K coating formulation comprising 100 wt. % Part A mixed with 100 wt. % Part B, plus a dual pigmented resin-hardener dispersion 30 of the invention added to the CB 2K coating in an amount of 50 wt. % based on the total weight percentage of the CB 2K coating. The addition of the present dual pigmented resin-hardener dispersion 30 adds volume to the base CB 2K formulation.

The resultant coating physical properties show that Example 2 of the present invention had overall superior results as compared to prior art samples 4-6. The inventive Example 2 resulted in both improved adhesion and hardness as compared to the prior art pigment replacement or underfill approaches, particularly those prior art approaches with a higher percentages of Part A underfill/replacement. In both the SBQ and the Clear Base the hardness was much higher than the prior art products with the 50% pigment underfill/replaced.

TABLE 2

| CB SAMPLES | PA 4 | PA 5 | PA 6 | EXAMPLE 2 |
|---|---|---|---|---|
| Adhesion Day 1 | 593.03 | 593.03 | 559.53 | 653.38 |
| Hardness Day 1 | 66 | 73 | 52.2 | 63.2 |
| Hardness Day 3 | 79 | 82 | 53.6 | 74 |

It is often required to replace a significant amount, particularly up to 50 wt. % (or more), in order to provide the resultant pigmented 2K coating 40 with adequate or desired coloring. Additional comparative tests were performed for prior art samples 7-10 as compared to Examples 3-4 of the present invention which included a dual pigmented resin-hardener dispersion 30 added to a base SBQ 2K coating formulation. The pigment dispersion used in Samples 8 to 10 was a resin or resinous-based pigment dispersion comprising 16% resin, 44% pigment, 26.4% fillers, 10% diluents for viscosity control, and the remainder additives to aid dispersing, foam control, etc. The results are shown in Table 3 below.

In the below comparative results, prior art sample 7 was the control comprising only SBQ made in accordance with the manufacturer's instructions which required all of Part A to be mixed with all of Part B (i.e., 100 parts by weight Part A was mixed with 44.6 parts by weight Part B). This prior art sample 7 was used to form SBQ control coatings for comparative testing. Tests were performed on the SBQ control sample coatings 7 to obtain ideal test measures of the SBQ control coating itself. When adding a pigment dispersion to the SBQ composition, it is desirable to meet or come as close as possible to the test results obtained for the SBQ control coating.

Prior art samples 8 and 9 include SBQ prepared in accordance with manufacturer directions and then an extra amount of pigmented resin dispersion is added to the SBQ in an overfill (excess). Prior art sample 8 was overfilled with 25 wt. % pigment resin dispersion, while prior art sample 9 was overfilled with 33 wt. % pigment resin dispersion, both based on weight percentage of the SBQ weight. Prior art sample 10 was a short-filled coating made by mixing 80 parts by weight of SBQ Part A to 44.6 parts by weight of SBQ Part B, and adding a pigment dispersed in resin in an amount of 38 wt. % of the total mass of Part A and Part B.

The test results of the exemplary embodiments of the invention, Examples 3 and 4, show the advantages of the two-component system 10 of the invention for pigment dispersion addition, over added volume of pigment resin dispersions alone. Using the present two-component system 10 to add pigment dispersion plus hardener to a reactive coating enables maintaining the ideal/preferred resin to hardener ratio, which results in sufficient and adequate hardness development (based on the control results). The present two-component system 10 and methods of the invention for adding pigment dispersion to a coating formulation using a pigment dispersion with a stoichiometric or near stoichiometric addition of hardener also enables repeatable batch-to-batch results to provide a resultant coating having consistent properties, characteristics and attributes. The resultant coating physical properties show that Examples 3 and 4 of the present invention exhibited acceptable characteristics and performance as that of the control sample, and were found to be easier to implement and provide more repeatable results as compared to the short-filled Prior Art sample 10.

The test results of the exemplary embodiments of the invention, Examples 3 and 4, show the advantages of the two-component system 10 of the invention for pigment dispersion addition, over added volume of pigment resin dispersions alone. Using the present two-component system 10 to add pigment dispersion plus hardener to a reactive coating enables maintaining the ideal/preferred resin to hardener ratio, which results in sufficient and adequate hardness development (based on the control results). The present two-component system 10 and methods of the invention for adding pigment dispersion to a coating formulation using a pigment dispersion with a stoichiometric or near stoichiometric addition of hardener also enables repeatable batch-to-batch results to provide a resultant coating having consistent properties, characteristics and attributes. The resultant coating physical properties show that Examples 3 and 4 of the present invention exhibited acceptable characteristics and performance as that of the control sample, and were found to be easier to implement and provide more repeatable results as compared to the short-filled prior art sample 10.

TABLE 3

| | D Shore Hardness | | | | | | | | 100 MEK Rubs |
|---|---|---|---|---|---|---|---|---|---|
| | Day 1 | Day 2 | Day 3 | Day 6 | Day 7 | Day 8 | Day 9 | Day 10 | Day 9 |
| Prior Art Sample 7: SBQ (Control) | 27 | 53 | 62 | 64 | 67 | 69 | 68 | 70 | Loss of gloss |
| Prior Art Sample 8: SBQ + 25 wt. % Pigment Overfill | 13 | 47 | 49 | 58 | 62 | 62 | 61 | 64 | Loss of gloss |
| Prior Art Sample 9: SBQ + 33 wt. % Pigment Overfill | 11 | 39 | 46 | 56 | 55 | 57 | 58 | 58 | Loss of gloss |
| Prior Art Sample 10: SBQ (resin short-filled) + 38 wt. % Pigmented Resin | 24 | 53 | 62 | 66 | 68 | 70 | 70 | 72 | Loss of gloss |
| EXAMPLE 3: SBQ + 25% dispersion 30 | 28 | 55 | 65 | 67 | 69 | 70 | 70 | 70 | Loss of gloss |
| EXAMPLE 4: SBQ + 33% dispersion 30 | 22 | 52 | 65 | 67 | 69 | 71 | 70 | 71 | Loss of gloss |

Known approaches of adding a resin-based pigment dispersion into a coating formulation undesirably alters characteristics, properties, and attributes of such coating formulation. For instance, it has been found that the addition of a resin-based pigment dispersion alters the resin (Part A) to hardener (Part B) ratios, which formulates coatings not fit for their intended purpose. It has also been found that the addition of resin-based pigment dispersions may introduce excess inert material into the coating. The various embodiments of the invention for pigment dispersion addition to a reactive coating formulation avoid these problems of known approaches. While the MEK rubs test rendered no difference between the pigment addition methods, the improved results of the invention are shown in the coating D Shore hardness (ASTM D2240-15 Standard Test Method for Rubber Property—Durometer Hardness) physical test data of Table 3 above.

The various embodiments of the invention provide easier and more efficient approaches to adding pigment dispersions to 2K coatings. By adding an amount of hardener that stoichiometrically corresponds to the resin in the pigment dispersion, the need for short-filling is alleviated. Furthermore, the volume of hardener in the dual component syringe can be easily adjusted to perfectly match the reactivity of each color of pigment dispersion, whereas short-filling the resin container only compensates for an average dispersion reactivity among the various reactivities of the pigment dispersions used for different colors. The various two-component systems of the invention allow for more complete and uniform emptying of the full volume of pigment desired to color the coating. They also provide improved color consistency by ensuring that a set and repeatable amount of pigment is added to the 2K coating from batch-to-batch. They also avoid changing the resin to hardener ratio in the 2K coating, and help to prevent inert materials from being introduced into the coating. The use of the present dual component pigment addition methods maintain the proper resin to hardener ratio, and result in good hardness development as compared to conventional resin replacement methods that result in a significant drop in hardness.

The various aspects of the invention provide an easier method for pigment addition to a 2K coating. By adding an amount of hardener, which stoichiometrically corresponds to the resin in the pigment dispersion, short-filling the resin component is avoided. By maintaining stoichiometric ratio of resin-to-hardener in the 2K coating, the invention provides better color consistency by ensuring that a set and repeatable amount of pigment is added. The systems 10 of the invention (e.g., dual syringe 10) allow for more complete and uniform emptying of the full volume of pigment desired to color the coating. The volume of hardener in the dual component syringe can be easily adjusted to perfectly match the reactivity of each color of pigment dispersion, whereas the prior art short-filling the resin container only compensates for an average dispersion reactivity among the various reactivities of the pigment dispersions used for different colors.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for adding pigment to a two-part reactive resin coating formulation comprising:
   providing a two-part reactive resin coating formulation in a set amount, the two-part reactive resin coating formulation comprising a resin part and a hardener part and having a known first stoichiometric ratio of the resin part to the hardener part;
   providing a two-component dispensing system separate from the two-part reactive resin coating formulation, the two-component dispensing system having a first compartment containing a pigmented resinous composition and a second compartment containing a hardener composition, the first and second compartments are adjoined to each other;
   dispensing the pigmented resinous composition and the hardener composition from the first and second compartments in a second stoichiometric ratio that matches the known first stoichiometric ratio of the two-part reactive resin coating formulation;
   mixing the pigmented resinous composition and the hardener composition to form a dual pigmented resin-hardener dispersion having the second stoichiometric ratio that matches the known first stoichiometric ratio of the two-part reactive resin coating;
   dispensing the dual pigmented resin-hardener dispersion into the two-part reactive resin coating formulation thereby increasing the set amount; and
   mixing the dual pigmented resin-hardener dispersion with the two-part reactive resin coating formulation to form a pigmented two-part reactive resin coating formulation without deleteriously affecting the known first stoichiometric ratio of the two-part reactive resin coating formulation.

2. The method of claim 1 wherein the two-component dispensing system is selected from the group consisting of a dual component syringe, a two-component packaging system, a dual pack system, flexible divider pouches, dual burst pouches, matching foil bags, and a packaging system that delivers fixed amounts of the pigmented resinous composition and the hardener composition.

3. The method of claim 1 wherein the first compartment and the second compartment are adjoined to each other via a frame or housing of the two-component dispensing system.

4. The method of claim 1 wherein the pigmented resinous composition is entirely or partially dispensed from the first compartment.

5. The method of claim 1 wherein the hardener composition is entirely or partially dispensed from the second compartment.

6. The method of claim 1 wherein the known first stoichiometric ratio of resin-to-hardener in the two-part reactive resin coating formulation is a manufacturer set stoichiometric ratio.

7. The method of claim 1 wherein the known first stoichiometric ratio is determined by a ladder study.

8. The method of claim 1 wherein the pigmented resinous composition is the same as or compatible with the resin part of the two-part reactive resin coating formulation.

9. The method of claim 1 wherein the hardener composition is the same as the hardener part of the two-part reactive resin coating formulation.

10. The method of claim 1 wherein the hardener composition is compatible with the hardener part of the two-part reactive resin coating formulation.

11. The method of claim 1 wherein up to 50 wt. % of the dual pigmented resin-hardener dispersion is dispensed into the two-part reactive resin coating formulation, based on a total weight percentage of the two-part reactive resin coating formulation.

12. The method of claim 1 wherein together the pigmented resinous composition and the hardener composition comprise the dual pigmented resin-hardener dispersion that is dispensed into the two-part reactive resin coating formulation in an amount from 1 wt. % to 20 wt. %, based on a total weight percentage of the two-part reactive resin coating formulation.

13. The method of claim 1 wherein the two-part reactive resin coating formulation is a 2K reactive coating selected from the group consisting of an epoxy coating, acrylate coating, urethane coating, polyurea coating, polyaspartic coating, and combinations thereof.

* * * * *